UNITED STATES PATENT OFFICE.

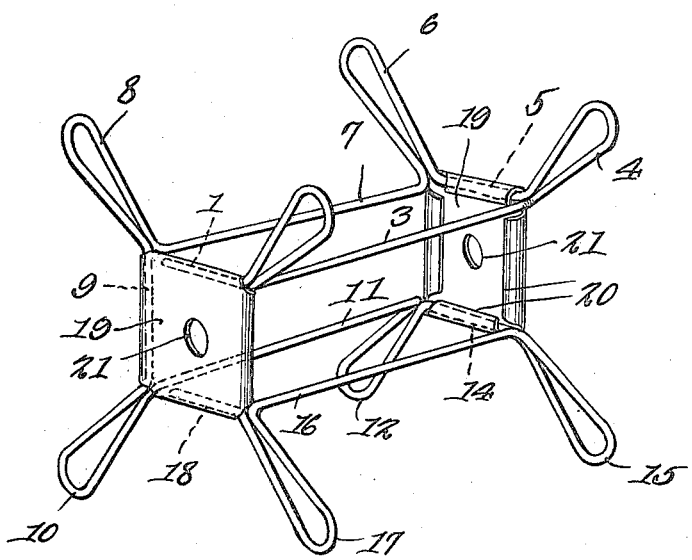
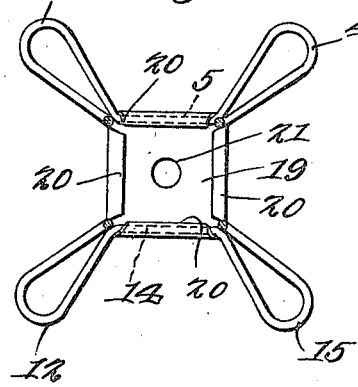
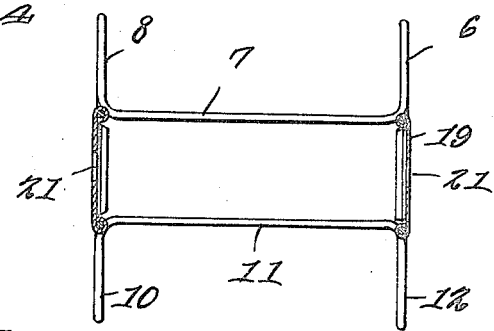

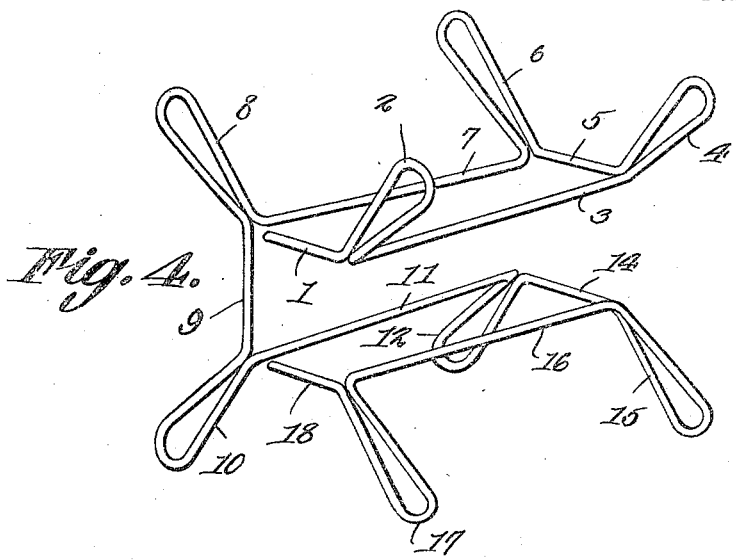
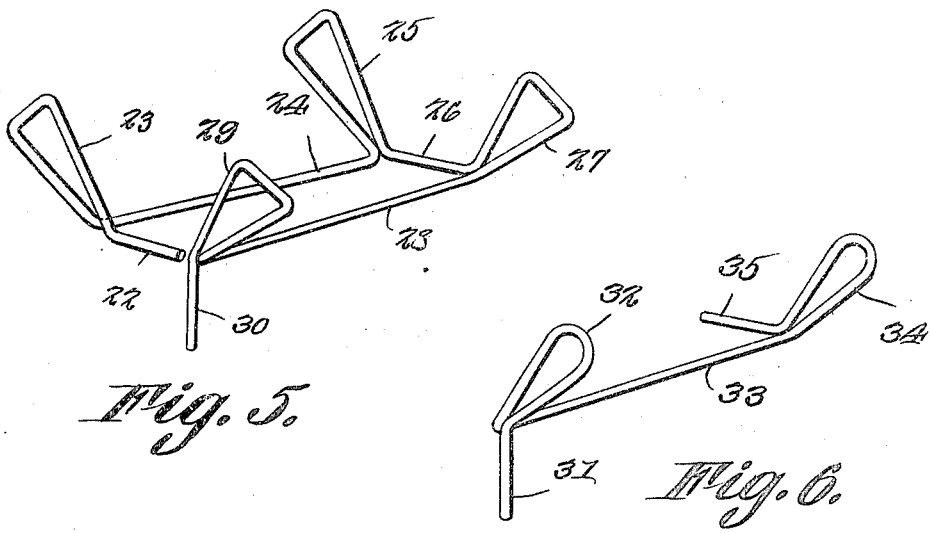

REUBEN D. WIRT, OF PHILADELPHIA, PENNSYLVANIA.

WIRE-REEL.

1,302,262.	Specification of Letters Patent.	Patented Apr. 29, 1919.

Application filed April 5, 1918. Serial No. 226,866.

*To all whom it may concern:*

Be it known that I, REUBEN D. WIRT, a citizen of the United States, residing at Philadelphia, in the county of Philadelphia and State of Pennsylvania, have invented a new and useful Wire-Reel, of which the following is a specification.

It is the object of this invention to provide a simple reel adapted to hold barbed wire, rope and the like, the reel embodying heads of novel form, and novel means for connecting the heads.

Changes such as a mechanic might make may be resorted to within the scope of what is claimed without departing from the spirit of the invention.

In the drawings:—

Figure 1 is a perspective showing one form of reel;

Fig. 2 is a cross section of the reel; Fig. 3 is a longitudinal section of the reel; Fig. 4 is a perspective showing the connector which unites the heads in Fig. 1; Fig. 5 is a perspective showing a modified connector; Fig. 6 is a perspective disclosing a further modification in the connector.

In carrying out the invention as shown in Figs. 1 to 4 there is provided a connector preferably made of wire or metal rod and including a finger 1 merging into a loop-shaped arm 2 continued to form a cross bar 3 extended into an arm 4 connected with a finger 5 merging into an arm 6 connected with a cross bar 7. The cross bar 7 is extended to form an arm 8 connected by a finger 9 with an arm 10 united with a cross bar 11 fashioned into an arm 12. The arm 12 is connected with a finger 14 extended to fashion an arm 15 united with a cross bar 16 carrying an arm 17 ending in a finger 18.

The arms 6, 4, 15 and 12 are disposed at one end of the connector and are parallel to the arms 17, 10, 8 and 2 which lie at the other end of the connector. The fingers 9, 18 and 1 are located in a common plane which is parallel to the plane in which the fingers 14 and 5 are disposed. The cross bars 7, 3, 16 and 11 are parallel. There may be any desired number of cross bars, the arms, such as the part 2, being shaped as desired.

The reel includes heads 19 having inwardly extended gripping flanges 20 which receive the fingers 1, 18, 14, 5 and 9.

The heads 19 are supplied with openings 21 whereby the reel may be mounted on a shaft.

As shown in Fig. 4, the connector is made in one piece but the connector may be fashioned in two pieces, one of which appears in Fig. 5 wherein 22 marks a finger connected with a loop-shaped arm 23 on a cross bar 24 carrying an arm 25 connected by a finger 26 with an arm 27 on a cross bar 28 having an arm 29 ending in a finger 30 located adjacent to the finger 22. The fingers 22, 30 and 26 of two such pieces as that shown in Fig. 5 being engaged by the flanges 20 of the heads 19.

When desired, the connector may be made in an increased number of parts, one of which appears in Fig. 6. The element shown in Fig. 6 includes a finger 31 extended into a loop-shaped arm 32 at one of the cross bar 33, the other end of the cross bar carrying an arm 34 having a finger 35 arranged at an angle to the finger 31, the fingers 31 and 35 being adapted to be received by the flanges 20 of the heads 19.

It will be seen that this invention comprises a reel embodying two metal heads of simple form united by a connector of equal simplicity, the resulting product being a reel which will be found to be of use in carrying wire, rope and like flexible materials.

I claim:

1. A reel including a frame member made of a single piece of wire fashioned into radial arms and a connection uniting the arms; and end pieces secured to the ends of the frame member to form a complete reel.

2. A reel embodying a cross bar having outstanding loop-shaped arms at its ends, the arms merging into angularly disposed fingers, the cross bar and the arms and the fingers being a one-piece structure; and heads having means for engaging the fingers.

3. A reel embodying approximately parallel cross bars, loop-shaped outstanding arms at the ends of the cross bars, a finger connecting the arms at one end of the cross bars, and angularly disposed fingers projecting from the arms at the other end of the cross bars, the cross bars, the arms and the fingers being a one-piece structure; and heads having means for engaging the fingers.

4. A reel embodying a plurality of sets of cross bars, the cross bars of all of the sets having outstanding loop-shaped arms at their ends, the arms of the cross bars of each set being connected at one end of the bars by fingers, certain of the arms of the cross bars of different sets being connected at the other end of the bars by a finger, other arms of the cross bars of different sets being provided with free-ended fingers located at the last specified end of the bars, the cross bars, the arms and the fingers being a one-piece structure; and heads having means for engaging the fingers.

In testimony that I claim the foregoing as my own, I have hereto affixed my signature in the presence of two witnesses.

REUBEN D. WIRT.

Witnesses:
J. B. WAITE,
C. G. NORCROSS.